Dec. 21, 1965   H. A. C. BRINKMANN   3,224,770
TENPIN
Filed Feb. 14, 1963   2 Sheets-Sheet 1

INVENTOR
HARRY A. C. BRINKMANN
BY Herbert A. Weintraub
ATTORNEY

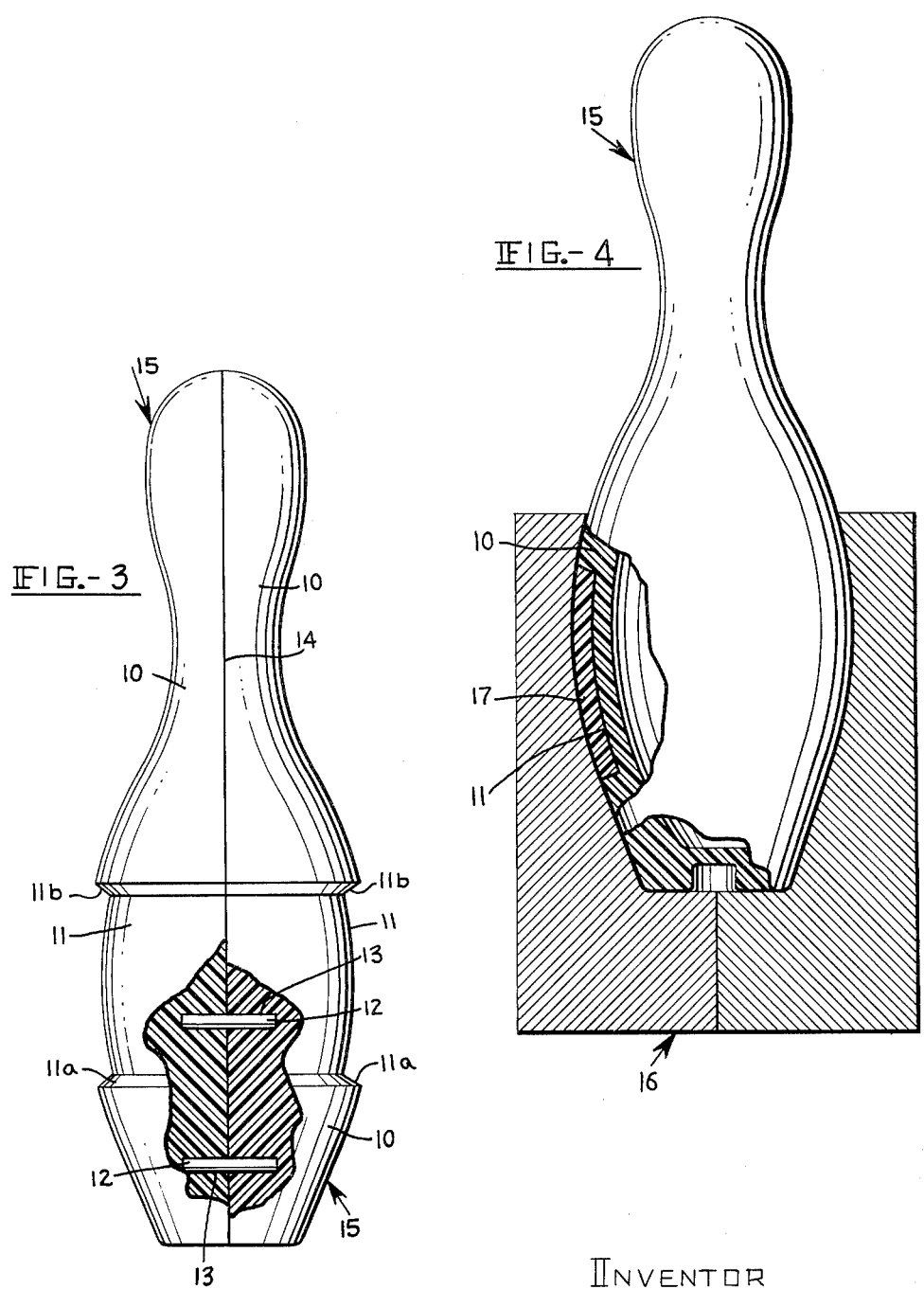

United States Patent Office 3,224,770
Patented Dec. 21, 1965

3,224,770
TENPIN
Harry A. C. Brinkmann, 2422 E. 13th St.,
Indianapolis, Ind.
Filed Feb. 14, 1963, Ser. No. 258,392
1 Claim. (Cl. 273—82)

This invention relates to a tenpin constructed out of plastics intended to replace the heretofore employed maple wood pins.

Reference is made to my prior Patent Nos. 2,487,218; 2,289,872; and 2,737,391. The solving of the problem of making an acceptable tenpin out of plastic has not been easy. There are many factors to be considered such as the overall weight of the pin; the durability of the pin; cost of manufacturing the pin; and, of importance to the bowler, the noise of impact of the ball with the pin or pins.

My solution of the problem of forming an acceptable tenpin is found in the following description of a method of forming the pin and the pin itself. The pin constructed by my method becomes to all intents and purposes an integral pin although made of two symmetrical halves. The major portion of the pin may be made out of a somewhat elastic plastic while the impact zone subject to pounding of the bowling ball is made out of a more rigid and durable material generally costing more than the other type of plastic forming the major part of the pin as indicated.

There is also an advantage in making the pin in the manner to be described in that the two parts of the pin are rigidly held one against the other by a tough encircling band which is limited to the "strike" zone around the pin so that the original formation of the two pin sections constitute the upper and lower end exposed portions of the pin without a covering having to extend thereover and therearound with exception of the intermediate zone as indicated. It is much easier to mold the pin of my invention.

Reference is made to the accompanying drawings, in which

FIG. 3 is a view in side elevation and partial section showing two pin halves united; and FIG. 4 shows the pin in a mold for receiving the central band therearound.

Figure 1:
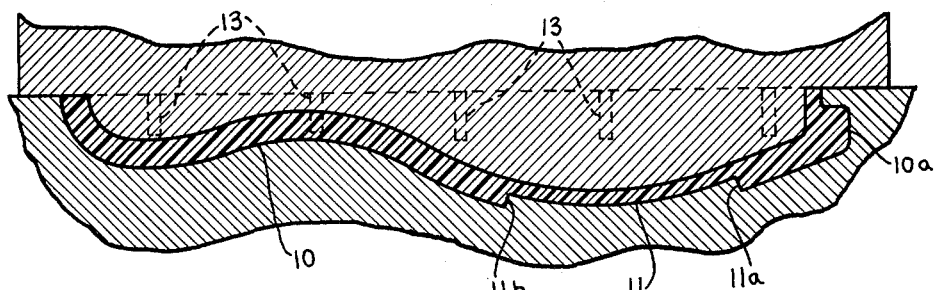
FIG. 1 is a diagrammatic section through a mold for forming a pin half.

As shown in my previous patents, a suitable mold is employed, FIG. 1, wherein plastic may be molded into the shape of a half portion 10 of a bowling pin. However in this procedure relating to the present invention, the pin half is molded to have a recessed central zone 11 extending entirely, circumferentially around the pin half 10.

The lower end of the indentation 11 designated by the numeral 11a will be spaced above the base of the pin 10 a vertical distance of approximately three inches on the standard pin, the dimensions of which are specified by the American Bowling Congress in a print, the last of which was published Aug. 1, 1958. In other words there is a standard design of a pin, and my invention applies to a design of the dimensions so specified. The top end of the indentation 11 designated by the numeral 11b will be approximately six and three-quarter inches vertically from the base 10a. In the drawings, these dimensions to the levels 11a and 11b are designated by the letter A and the letter B respectively.

The lines 11a and 11b extend circumferentially and horizontal planes respectively around the pin. The depth of the indentation may vary depending upon the particular plastic selected. Likewise the thickness of wall proper of the pin 10 may be varied depending upon the specific gravity of the plastic employed.

Figure 2:
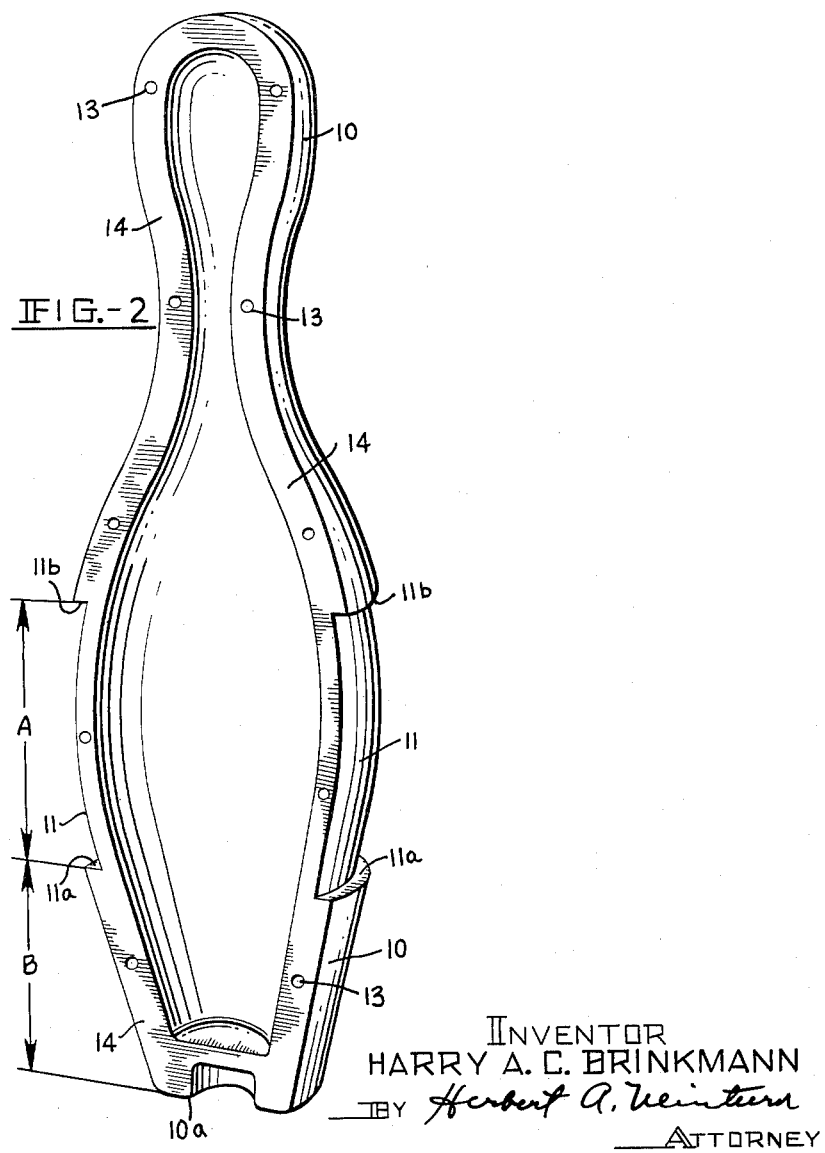
FIG. 2 is a view in perspective from the diametrical plane side of the pin half formed in the mold of FIG. 1.

Two of the halves 10 are brought together and dowel pins 12 are inserted in holes 13 which are molded in the pins extending substantially normally from the face 14 of the pin half 10. A plurality of these holes 13 are provided as indicated in FIG. 2. The holes 13 are of such depth that substantially a half length of a dowel pin 12 is inserted in one hole and the other half is inserted in the hole of the other pin half as indicated in FIG. 3. However before making these insertions of the dowel pins, the faces 14 of the two pin halves 10 are coated with a plastic adhesive and also the pins 12 are coated with adhesive so that they become bonded along with the two facess one with the other to form in effect an integral pin generally designated by the numeral 15. The dowel pins 12 will align one pin half 10 with the other pin half 10 to give the overall proper shape to the pin 15.

The pin 15 thus constructed is placed in a mold 16 herein indicated as a two-part mold, to have the mold 16 surround the pin from its base and up and around the pin to above the line 11b. Then the impact plastic designated by the numeral 17 is injected into the mold 16 so as to completely fill the cavity around the pin 15 formed by the indentation 11.

Of course other molding methods may be employed, such as are well known to those who are working in the forming of objects from plastics. The exact molding operation does not enter into my invention per se. The plastic 17 intimately bonds with the plastic of the pin halves 10 entirely around the indentation 11 and outwardly to the external surfaces of those halves above and below the indentation. The plastic material 17 blends intimately into the upper and lower ends of the indentation 11 so that there is no visible line between the pins 10 and the plastic at the lines 11a and 11b, unless of course the plastic 17 is made to be of a color different from that of the pins proper. In any event, there is a very smooth contour of the pins, and the external dimensions of the completed pin in each instance conforms to the dimensions within the tolerances permitted by the American Bowling Congress official pin design.

The plastic 17 thus not only serves to reinforce the pin around its "belt" area, further uniting one pin half 10 with the other pin half and thus maintaining that union, but also most importantly serves as an impact material absorbing blows of the ball. This material 17 is of that selection which will not crack or break under the hard impacts of the ball, but will be exceedingly durable over long periods of time of usage of the pin. Not only is the method of forming the pin simpler than the methods heretofore employed, but the tenpin also has greatly increased durability, and there is no need for a coating or sheet of plastic over the entire pin which may split off or separate.

Therefore while I have shown and described my invention in the one particular form, it is obvious that other methods of forming the pin may be employed particularly in the molding operations, and I therefore do not desire to be limited to that precise method beyond the limitations which may be imposed by the following claim.

I claim:

A plastic hollow tenpin having a belly subject to impact from a bowling ball and comprising
    a pair of plastic pin halves having longitudinally matching marginal faces;
    each pin half having a wall, the outer side of which defines the shape of half of the pin, and the inner face of which approximately follows the contour of the outer face and defines half the boundary surface of an interior cavity;

said halves abutting each other and being intimately united one with the other along said faces;

each half having a circumferential indentation in its outer wall matching that of the other wall and continuing around the wall with a vertical height extending above and below the zone of said bowling ball impact;

a band of plastic filling said indentation, intimately bonded to the plastic walls of said halves to become integral therewith, both circumferentially and at top and bottom ends, the outer surface of the band blending by its top and bottom edges smoothly into said half outer faces to form the belly of the pin;

said wall plastic being somewhat elastic and the band plastic being tougher and more rigid than the wall plastic, and forming in effect an integral part of the wall halves; and said halves being maintained in contact one with the other by said encircling band thereby resisting deformation of the band by reason of the band being supported vertically and circumferentially over a wide area of the more elastic back-up wall of the pin halves.

References Cited by the Examiner

UNITED STATES PATENTS

| | | | |
|---|---|---|---|
| 2,105,045 | 1/1938 | Kraft | 273—82 |
| 2,289,872 | 7/1942 | Brinkmann | 273—82 X |
| 2,494,351 | 1/1950 | Montero | 273—82 |
| 2,517,116 | 8/1950 | Klinger | 273—82 |
| 2,568,274 | 9/1951 | Clark | 273—82 X |
| 2,737,391 | 3/1956 | Brinkmann | 273—82 |

RICHARD C. PINKHAM, *Primary Examiner.*